United States Patent [19]

Ohmori et al.

[11] Patent Number: 5,648,944

[45] Date of Patent: *Jul. 15, 1997

[54] RECORDING/REPRODUCING APPARATUS THAT UTILIZES THE SERVO CLOCK SIGNALS TO FORM READ AND WRITE CLOCK SIGNALS WITH DIFFERENT FREQUENCIES

[75] Inventors: Kiyoshi Ohmori, Kanagawa; Tetsu Watanabe, Tokyo; Katsuhiro Seo, Tokyo; Junichi Kudo, Tokyo, all of Japan

[73] Assignee: Sony Corporation, Tokyo, Japan

[*] Notice: The term of this patent shall not extend beyond the expiration date of Pat. No. 5,329,503.

[21] Appl. No.: 662,268

[22] Filed: Jun. 12, 1996

Related U.S. Application Data

[63] Continuation of Ser. No. 480,559, Jun. 7, 1995, abandoned, which is a continuation of Ser. No. 248,624, May 24, 1994, abandoned, which is a continuation of Ser. No. 888,982, May 26, 1992, abandoned.

[30] Foreign Application Priority Data

May 28, 1991 [JP] Japan ................................ 3-152415

[51] Int. Cl.$^6$ ................................................ G11B 7/00
[52] U.S. Cl. ........................... 369/13; 369/50; 369/75.2; 369/77.2
[58] Field of Search .......................... 369/75.2, 77.2, 369/13, 264, 270, 47, 50; 360/114, 59, 99.06, 48, 53

[56] References Cited

U.S. PATENT DOCUMENTS

| | | | |
|---|---|---|---|
| 4,376,956 | 3/1983 | Kelleher | 358/322 |
| 4,823,336 | 4/1989 | Inada et al. | 369/215 |
| 4,914,647 | 4/1990 | Ono et al. | 369/77.2 |
| 5,025,436 | 6/1991 | Crain et al. | 369/77.2 |
| 5,027,334 | 6/1991 | Yamanaka et al. | 369/13 |
| 5,070,494 | 12/1991 | Emoto et al. | 369/112 |
| 5,091,898 | 2/1992 | Bessho et al. | 369/77.2 |

(List continued on next page.)

FOREIGN PATENT DOCUMENTS

| | | |
|---|---|---|
| 56-74865 | 6/1981 | Japan . |
| 58-115659 | 7/1983 | Japan . |
| 61-267972 | 11/1986 | Japan . |
| 61-269267 | 11/1986 | Japan . |
| 61-280037 | 12/1986 | Japan . |
| 63-69076 | 3/1988 | Japan . |
| 1-86375 | 3/1989 | Japan . |
| 1-89068 | 4/1989 | Japan . |
| 4-90172 | 3/1992 | Japan . |
| 4-139654 | 5/1992 | Japan . |

OTHER PUBLICATIONS

U.S. Ser. No. 07/967,999 Ohmore et al., filed Oct. 26, 1992.
U.S. Ser. No. 07/966,682 Ohmore et al., filed Oct. 26, 1992.
U.S. Ser. No. 07/888,982 Ohmore et al., filed May 26, 1992.
U.S. Ser. No. 07/900,860 Maeda, filed Jun. 18, 1992.
U.S. Ser. No. 07/976,277 Yamamoto, filed Nov. 13, 1992.

*Primary Examiner*—W. R. Young
*Attorney, Agent, or Firm*—Limbach & Limbach L.L.P.

[57] ABSTRACT

A disc recording and/or reproducing apparatus including a signal recording/reproducing section for recording and/or reproducing information signals on a disc 64 mm in diameter housed in a cartridge main body to form a disc cartridge, a loading mechanism for loading or unloading the disc cartridge on or from the signal recording/reproducing section and a control circuit controlling the recording/reproducing operation of the recording/reproducing section. The disc has a signal recording part divided into plural signal recording zones of substantially equal line recording density across the inner and the outer peripheries of the disc. The signal recording/reproducing section, the loading mechanism and the control circuit are housed in a casing which is 70 mm or less in width, 100 mm or less in length and 24.5 mm or less in height and which is provided with a disc inserting opening. The apparatus may be reduced in size without decreasing the recording capacity.

7 Claims, 9 Drawing Sheets

U.S. PATENT DOCUMENTS

| | | | |
|---|---|---|---|
| 5,115,423 | 5/1992 | Maeda et al. | 369/112 |
| 5,122,998 | 6/1992 | Mizuno et al. | 369/13 |
| 5,124,971 | 6/1992 | Nomura et al. | 369/215 |
| 5,132,944 | 7/1992 | Berg | 369/13 |
| 5,172,367 | 12/1992 | Hinotani | 369/215 |
| 5,187,702 | 2/1993 | Takahashi | 369/215 |
| 5,210,660 | 5/1993 | Hefzler | 360/48 X |
| 5,220,543 | 6/1993 | Kuroda et al. | 369/13 |
| 5,329,503 | 7/1994 | Ohmori et al. | 369/13 |

RECORDING/REPRODUCING APPARATUS THAT UTILIZES THE SERVO CLOCK SIGNALS TO FORM READ AND WRITE CLOCK SIGNALS WITH DIFFERENT FREQUENCIES

This is a continuation of application Ser. No. 08/480,559 filed on Jun. 7, 1995, now abandoned, which is a file wrapper continuation of Ser. No. 08/248,624 filed on May 24, 1994, now abandoned, which is a file wrapper continuation of Ser. No. 07/888,982 filed May 26, 1992, now abandoned.

BACKGROUND OF THE INVENTION

1. Field of the Invention

This invention relates to a disc recording and/or reproducing apparatus for recording and/or reproducing information signals using a disc cartridge in which a disc is accommodated in a cartridge main body.

2. Description of the Related Art

There has hitherto been proposed a disc recording and/or reproducing apparatus for recording and/or reproducing information signals using a disc cartridge in which a disc, such as an optical disc or a magneto-optical disc, is accommodated in a cartridge main body.

The disc recording and/or reproducing apparatus includes a chassis on which there are mounted a loading unit for transporting the disc cartridge to a predetermined loading position, a rotating driving unit for holding and rotationally driving the disc in the disc cartridge at the loading position and an optical head unit for writing and/or reading information signals on or from the disc held by the rotating and driving unit.

The loading unit includes a cartridge holder for holding the disc cartridge introduced into the recording/reproducing apparatus. The cartridge holder, which may be moved vertically within the main body of the apparatus by means of a cam or the like, holds the disc cartridge in a parallel position with respect to the chassis. The loading unit first shifts the disc cartridge, held by the cartridge holder, in a direction parallel to the major surface of the disc, that is parallel to the chassis. When the disc is brought to a position directly above the rotating and driving unit, the loading unit shifts the disc cartridge vertically towards the chassis.

With the disc cartridge thus displaced towards the chassis, the disc housed in the disc cartridge is held by the rotating and driving unit provided on the chassis.

The optical head unit is mounted on the chassis for facing the major surface, the signal recording surface, of the disc which is rotationally driven by the rotating and driving unit. The optical head unit is supported for being moved radially and across the inner and outer peripheries of the disc. With the disc being rotated by the rotating and driving unit and with the optical head unit being moved radially of the disc, the light flux may be radiated by the optical head unit on substantially the entire signal recording surface of the disc, so that information signals may be recorded on or reproduced from substantially the entire signal recording surface of the disc.

The optical head unit is also provided with an object lens driving device for performing focusing and tracking servo operations for causing the light flux radiated on the disc to follow deviations from a horizontal plane or concentric positions caused by disc rotation. The object lens driving device supports an object lens converging and radiating the light flux by a supporting member formed of a flexible material so that the object lens may be moved in two directions, that is in a direction along the optical axis and a direction perpendicular thereto. The object lens driving device also includes an electro-magnetic driving device for moving the object lens in these two directions. This electro-magnetic driving device includes a coil which is mounted on a lens bobbin supporting the object lens and which is supplied with a driving current based on focusing and tracking error signals employed in the focusing servo and tracking servo operations, and a magnetic circuit for passing the magnetic flux through the coil.

In the above-described disc recording/reproducing apparatus, it is difficult to simplify the construction and manufacture and to reduce the size of the apparatus because of the complex structure of the loading unit adapted for moving the disc cartridge in the horizontal and perpendicular directions.

Besides, it is also difficult with the above-mentioned disc recording and/or reproducing apparatus to simplify the construction and reduce the size of the optical head unit because the optical head unit needs to be provided with the above-described object lens driving device.

It may be contemplated to use a small-sized disc to reduce the size of the disc recording and/or reproducing apparatus. However, if the disc of the smaller size be used for reducing the size of the disc recording and/or reproducing apparatus, the recording capacity for the information signals is diminished, so that the advantages of a large capacity information storage device may be lost.

OBJECT AND SUMMARY OF THE INVENTION

In view of the above-depicted status of the art, it is an object of the present invention to provide a disc recording and/or reproducing apparatus which may be simplified in manufacture and reduced in size and construction without diminishing the recording capacity for information signals.

The present invention provides a disc recording and/or reproducing apparatus comprising signal recording/reproducing means including an optical head means, external magnetic head generating means and rotating driving means, said signal recording/reproducing means rotationally driving a disc 64 mm in diameter by said rotating driving means at a constant angular velocity, said signal recording/reproducing means radiating a light beam to said disc by said optical head means and applying an external magnetic field to said disc by said external magnetic field generating means for recording information signals on said disc, said signal recording/reproducing means radiating the light beam to said disc by said optical head for reading information signals from said disc, said disc being housed in a cartridge main body so that the information signals may be recorded or reproduced from outside, said disc having an information recording section divided from the inner periphery towards the outer periphery into plural signal recording regions having substantially equal line recording density, loading means for loading a disc cartridge on said signal recording/reproducing means or unloading said disc cartridge from said signal recording/reproducing means, said disc cartridge comprising said disc accommodated in said cartridge main body, and controlling means for controlling the recording/reproducing operation of said signal recording/reproducing operation, said signal recording/reproducing means, said loading means and said controlling means being housed in a casing which is 70 mm or less in width, 100 mm or less in length and 24.5 mm or less in height, and which is provided with a disc cartridge inserting opening on a front side thereof.

In the disc recording and/or reproducing apparatus according to the present invention, the signal recording/reproducing section for recording and/or reproducing information signals on or from a disc which is 64 mm in diameter and which has a signal recording region divided into plural signal recording zones of substantially equal line recording density across its inner and outer peripheries, loading means for loading or unloading a disc cartridge, which is the disc housed in a cartridge main body, with respect to the signal recording/reproducing section, and controlling means for controlling the recording and/or reproducing operation of said signal recording/reproducing section, are housed in the casing which is sized as above and provided with the disc inserting opening, so that the recording capacity is diminished and the apparatus may be reduced.

Other objects and advantages of the present invention will become apparent from the following description.

DETAILED DESCRIPTION OF THE PREFERRED EMBODIMENTS

Figure 1:
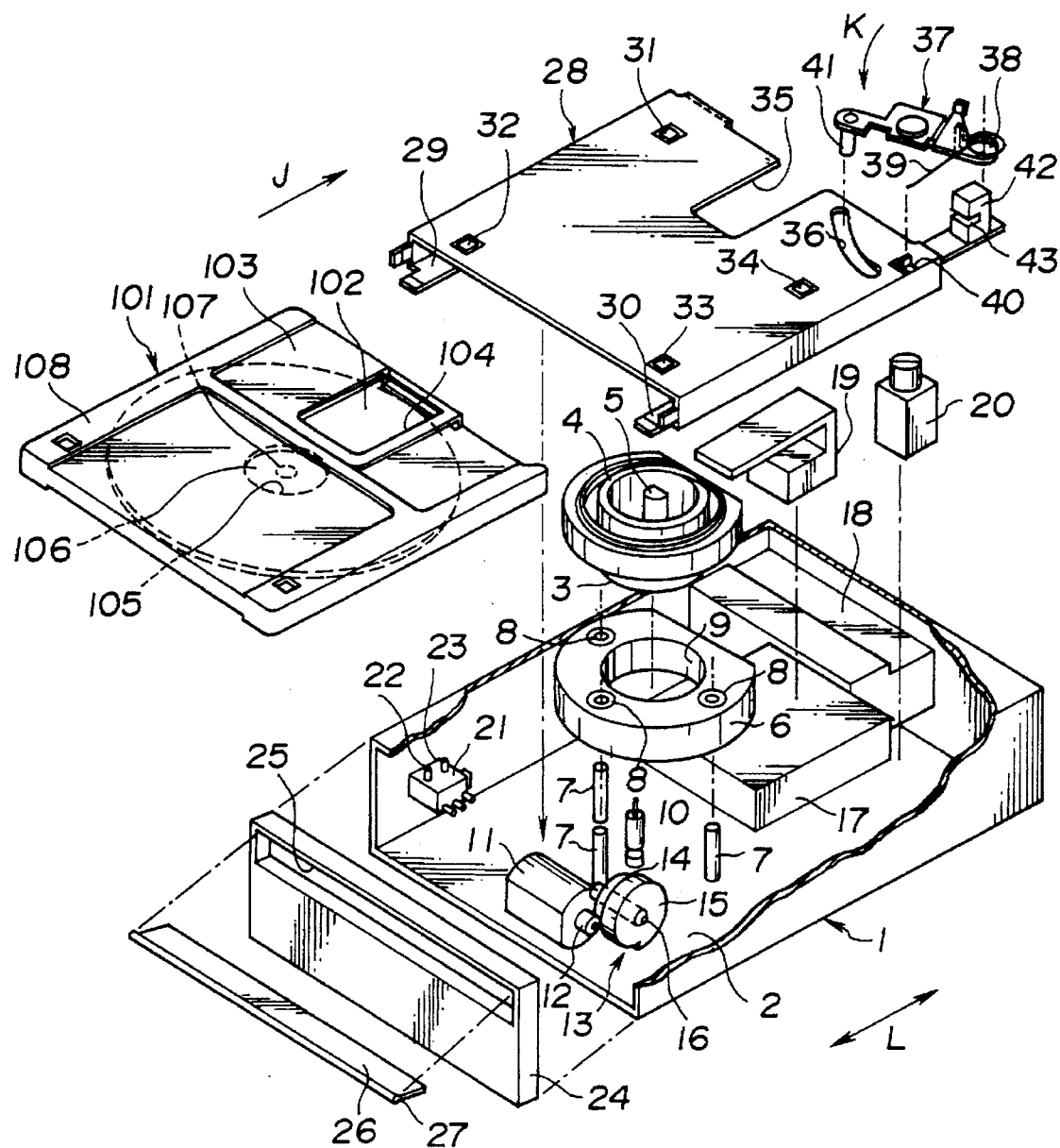
FIG. 1 is an exploded perspective view showing a disc cartridge and an essential part of a disc recording and/or reproducing apparatus on which the disc cartridge is to be loaded.

Referring to the drawings, certain preferred embodiments will be explained in detail.

Figure 2:
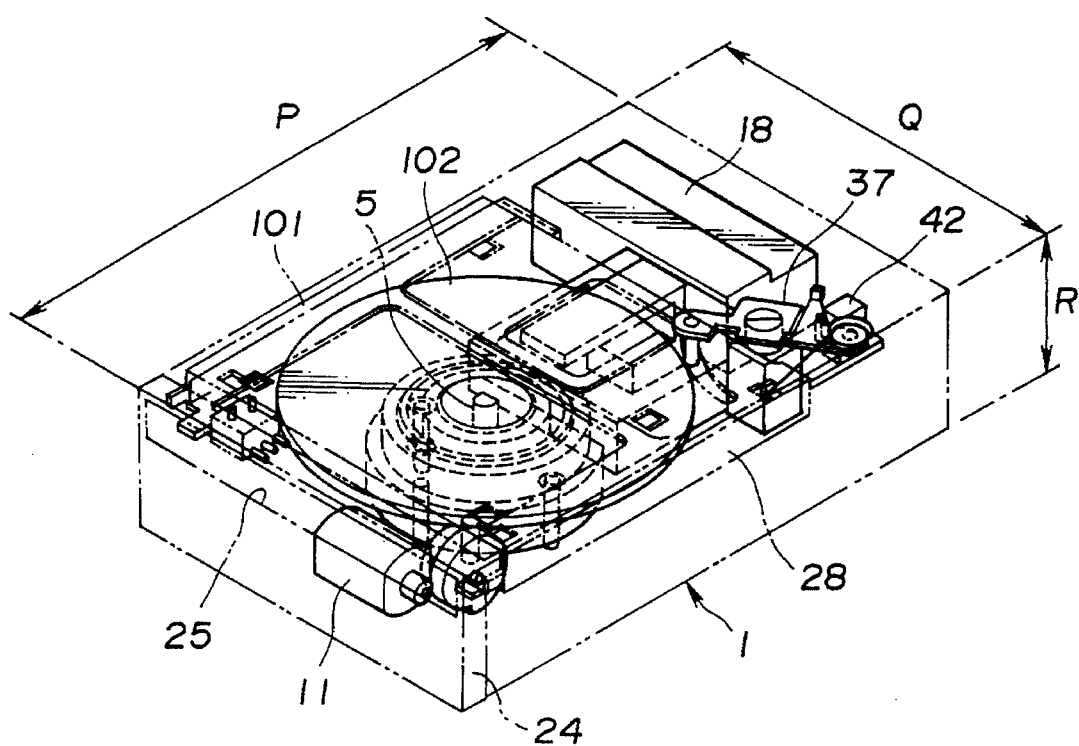
FIG. 2 is a perspective view showing the state in which the disc cartridge has been loaded on the disc recording and/or reproducing apparatus shown in FIG. 1.

In these embodiments, the disc recording and/or reproducing apparatus is designed as an apparatus for recording and/or reproducing information signals using a disc cartridge 101 having a magneto-optical disc accommodated in a cartridge main body, as shown in FIGS. 1 and 2.

Referring to FIG. 1, a disc cartridge 101 includes a magneto-optical disc 102 rotatably accommodated in a cartridge main body 108. The magneto-optical disc 102 includes a disc substrate formed of a light-transmitting synthetic resin and a signal recording layer of a magnetic material deposited on one major surface of the disc substrate. The magneto-optical disc 102 has a diameter E shown in FIG. 7 which is equal to 86 mm. A hub-mounting opening 105 is formed at the center of the magneto-optical disc 102. A disc hub 106, by means of which the magneto-optical disc 102 is retained by a disc table 23 of the disc recording and/or reproducing apparatus according to the present invention, is mounted in the hub-mounting opening 105. The disc hub 106 is formed of a magnetic material, such as metal, in the form substantially of a disk, and is mounted on the disc substrate of the magneto-optical disc 102 by welding or with the aid of an adhesive. The disc hub 106 is formed with a centering hole 107 having its center coincident with the center of curvature of a spirally extending substantially concentric recording track formed on the signal recording surface of the magneto-optical disc 102.

Figure 6:
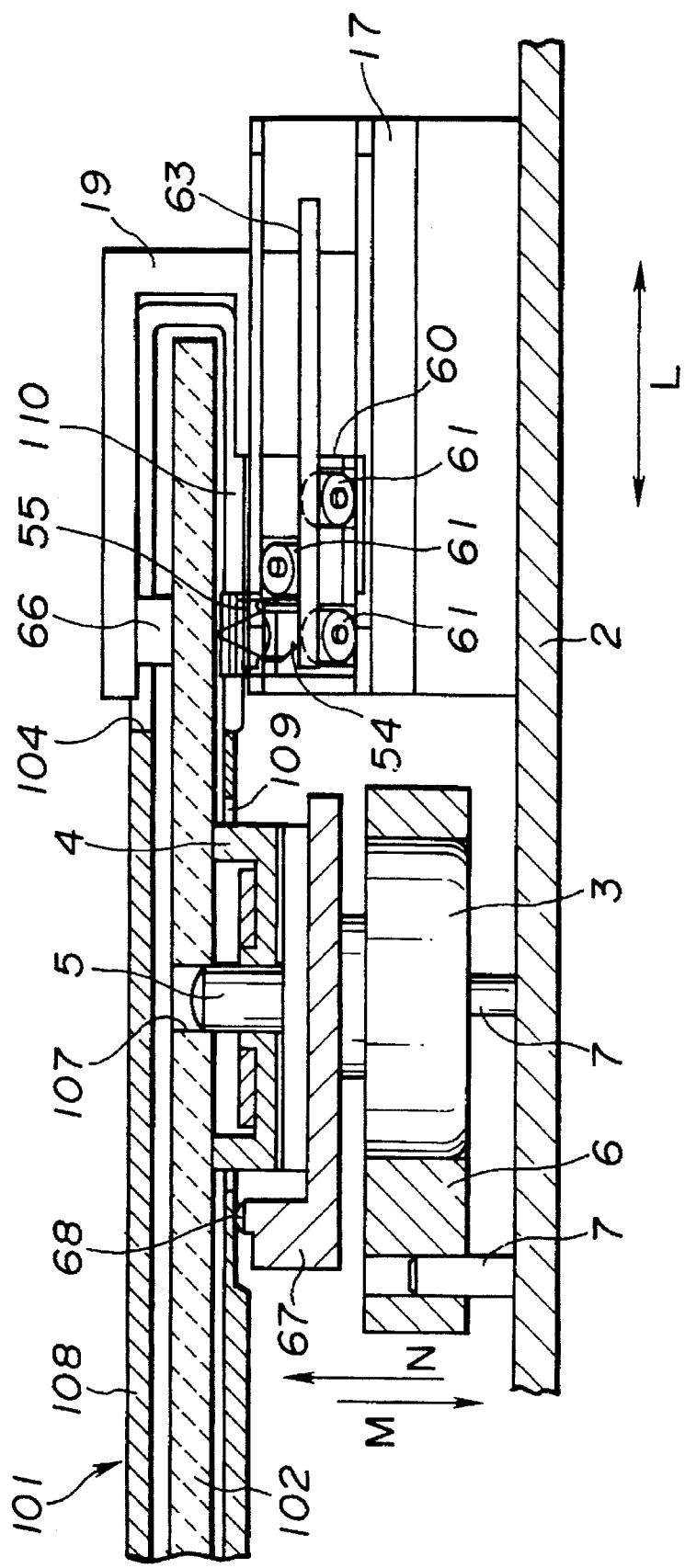
FIG. 6 is an enlarged side elevational view showing the state in which the operation of holding the disc cartridge introduced into the disc recording and/or reproducing apparatus has been completed, with a portion thereof being broken away.

The cartridge main body 108 is made up of upper and lower halves abutted and connected to each other to the shape of a thin casing capable of accommodating the magneto-optical disc 102. The upper major surface of the cartridge main body 108 is provided with an upper recording/reproducing aperture 104 for laying to outside the signal recording region on one major surface of the magneto-optical disc 102 across the inner and outer peripheries of the disc. The lower major surface of the cartridge main body 108 is provided with a lower recording/reproducing aperture 110 for laying to outside the signal recording region on the opposite major surface of the magneto-optical disc 102 across the inner and outer peripheries of the disc, as shown in FIG. 6. The lower recording/reproducing aperture 10 is formed at a position in register with the upper recording/reproducing aperture 104 on the lower surface of the cartridge main body 108 and has a size substantially equal to that of the upper recording/reproducing aperture 104.

The lower major surface of the cartridge main body 108 is provided with a chucking opening 109 via which the disc hub 106 of the magneto-optical disc 102 is laid to outside. The perimetral region of the chucking opening 109 is formed with recesses engaged by abutting protuberances 68 of the recording and/or reproducing apparatus according to the present invention.

A shutter member 103 is mounted on the cartridge main body 108. The shutter member 103 is produced by bending a metal sheet or injection molding of a synthetic resin into the cross-sectional shape of a letter U for clampingly holding the upper and lower major surfaces at a lateral side of the cartridge main body 108. The shutter member 103 includes an upper plate section lying along the upper major surface of the cartridge main body, a lower plate section extended parallel to the upper plate section and a connecting section connecting the proximal side of the upper plate section to that of the lower plate section. The shutter member 103 is supported by the cartridge main body 108 for sliding movement along the front side of the cartridge main body 108 contacted with the connecting section. The upper and lower plate sections are formed with apertures located towards a lateral side of the shutter member 103 along the direction of movement thereof relative to the cartridge main body 108.

When the shutter member 103 is not in use, that is, when it is at a first position relative to the cartridge main body 108, the recording/reproducing apertures 104, 110 of the cartridge main body 108 are closed by the upper and lower plate sections of the shutter member 103. When the shutter member 103 is in use, that is, when it is at a second position relative to the cartridge main boy 108, the apertures of the shutter member 103 are aligned with the recording/ reproducing apertures 104, 110, so that these apertures 104, 110 are opened. The shutter member 103 is resiliently biased by a spring member, not shown, provided within the cartridge main body 108, in a direction towards the first position of normally closing the recording/reproducing apertures 104, 110.

The apertures of the shutter member 103 are formed to affect upper and lower lateral edges of the connection section. That is, the connecting section of the shutter member 103 is of a narrower width at the apertures thereof than at the remaining portions of the connecting section, which width is smaller than the thickness of the magneto-optical disc 102. On the other hand, the portion of the cartridge main body 108 in the vicinity of the rim of the magneto-optical disc 102 and the recording/reproducing apertures 104, 110, that is the forward lateral side of the cartridge main body 108 laid to outside via the apertures of the shutter member 103 on opening the recording/reproducing apertures 104, 110, is of a thickness less than the thickness of the magneto-optical disc 102.

Referring to FIGS. 1 and 2, the disc recording and/or reproducing apparatus according to the present invention includes a casing 1 having a bottom formed as a chassis 2 the forward side of which is opened. The opened side of the casing 1 is closed by a front panel 24 having a slit-shaped disc cartridge inserting opening 25 via which the disc cartridge 101 may be introduced. The opening 25 may be closed by a lid 26 which is in the form of a rectangular bar corresponding in shape and a size to the opening 25 and which is rotatably supported within the extent of the opening 25 by an elongated pivot shaft 27. The lid 26 may be rotated about the rotary shaft 27 as a center of rotation for opening or closing the opening 25.

The casing 1, inclusive of the front panel 24, is of a width, depth and a height, indicated by arrows Q, P and R in FIG. 2, respectively, equal to 70 mm or less, 100 mm or less and 24.5 mm or less, respectively.

A signal recording/reproducing section, including rotational driving means, optical head means and magnetic field generating means, is provided on the chassis 2 constituting the bottom plate of the casing 1.

Thus a spindle motor 3, constituting rotating and driving means for rotationally driving the disc 102 in the disc cartridge 101, is mounted on the chassis 2. The spindle motor 3 is mounted on an annular lifting block 6 constituting loading means and which is provided with a center hole 9 supporting the spindle motor 3 fitted therein. The lifting block 6 includes a plurality of through-holes 8 each fitted with a slide bearing. A plurality of motor guide shafts 7, mounted upright on the chassis 2, are passed through these through-holes 8 so that the lifting block 6 may be moved towards and away from the chassis 2 as indicated by arrows M, N in FIG. 6. Thus the spindle motor 3 may be moved towards and away from the chassis 2. The spindle motor 3 has a spindle shaft 5, integral with a rotary shaft, substantially perpendicular to the chassis 2. The spindle shaft 5 has its distal end directed upwards with respect to the chassis 2.

A disc table 4 is mounted on the rotary shaft of the spindle motor 3 for encircling the perimeter of the distal end of the spindle shaft 5. The disc table 4 is in the form of a disk having substantially the same diameter as the disc hub 106 for setting the disc hub 106 attached to the magneto-optical disc. Between the spindle shaft 5 and the perimeter of the disc table 4, there is mounted an annular permanent magnet, integrally with the disc table 5, for magnetically attracting the disc hub 106 of the magneto-optical disc 102 set on the disc table 4.

On the upper surface of the lifting block 6, there is mounted the above-mentioned substantially annular cartridge-positioning member 67 for encircling the disc table 4. At least three abutting protuberances 68 are formed on the upper surface of the cartridge positioning member 67. The upper ends of these protuberances 68 define a plane which is closer to the chassis than and parallel to the disc hub setting plane of the disc table 4.

A lifting motor 11 for lifting the lifting block 6 and the disc table 4 with respect to the chassis 2 is mounted in proximity to the spindle motor 3 on the chassis 2. The lifting motor 11 is supported by a gear box, not shown, mounted on the chassis 2. The gear box includes a cam gear 13 meshing with a driving gear 12 mounted on a driving shaft of the lifting motor 11. The cam gear 13 is made up of a gear part 14 engaged with the driving gear 12 for transmission of the driving force of the lifting motor 11, and a cam part 15. The lifting block 6 is engaged with and set on the cam part 15 and may be lifted by the cam part 15 on rotation of the cam gear 13. The lifting motor 11 is a stepping motor the rotational angular position of which may be controlled accurately. The lifting block 6 is resiliently biased in a direction towards the chassis 2 by a tension coil spring 10 provided between the lifting block and the chassis 2, so that the lifting block is pressedly engaged with the cam part 15 of the cam gear 13.

The optical pickup device of optical head means, made up of an optical block 18 and an object lens driving device 17, is mounted on the chassis 2 at the rear side of the spindle motor 3 when viewed in the inserting direction of the disc cartridge 101 into the main body of the disc recording/ reproducing apparatus. The optical pickup device is designed for radiating a write-read light beam to the disc 102 set on the disc table 4.

Figure 3:
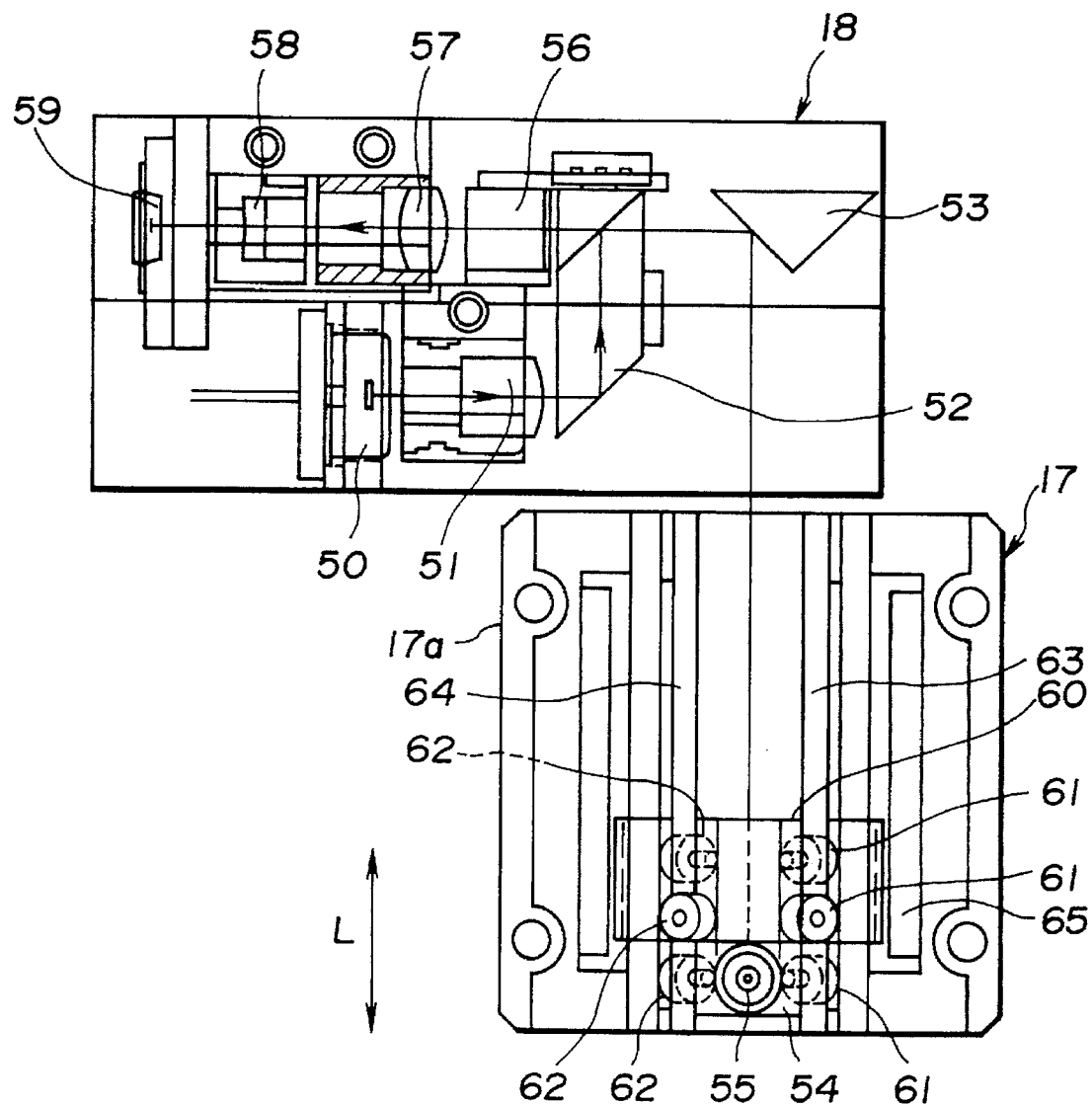
FIG. 3 is an enlarged plan view showing the construction of an optical pickup device of the disc recording and/or reproducing apparatus, with a portion thereof being broken away.

Referring to FIG. 3, the optical block 18 includes a barrel block housing a laser diode 50 as a light source and a plurality of optical components for transmitting the light beam radiated from the laser diode 50. Specifically, a diverging light beam, radiated by the laser diode 50 in the optical block 18, is incident on a collimator lens 51. The light beam collimated by the collimator lens 51 is incident on a galvanomirror 53 via a beam splitter prism. The galvanomirror 53 is controlled by controlling means as later described for deflecting and reflecting the incident parallel light beam based on predetermined control signals. The collimated light beam, reflected by the galvanomirror 53, is radiated from the optical block 18 so as to be incident on the object lens driving device 17.

The object lens driving device 17 includes a frame 17a and a pair of guide shafts 63, 64 mounted within the frame 17a. These guide shafts 63, 64 are mounted within the frame 17a so as to be parallel to each other and to the frame 17a as well as being parallel to the chassis 2. A lens bobbin block 60 is mounted between these guide shafts 63, 64. Three guide rolls 61, 62 each are provided on both lateral sides of the lens bobbin block 60 faced by the guide shafts 63, 64. At least one of the guide rolls 61 is supported by an arbor extended obliquely upwards at 45° relative to the lens bobbin block 60, while the remaining guide rolls 61 are supported by arbors extended obliquely downwards at 45° relative to the lens bobbin block 60. These guide rolls 61, clampingly holding the guide shaft 63, may be rolled on the guide shaft 63. Similarly to the guide rolls 61, the guide rolls 62 on the opposite lateral side of the lens bobbin block 60 are so supported that at least one of the guide rolls 62 is supported by an arbor extended obliquely upwards at 45° relative to the lens bobbin block 60, while the remaining guide rolls 62 are supported by arbors extended obliquely downwards at 45° relative to the lens bobbin block 60. These guide rolls 62, clampingly holding the guide shaft 64, may be rolled on the guide shaft 64.

The lens bobbin block 60 is moved in directions towards and away from the spindle motor 3 along the axes of the guide shafts 63, 64, as indicated by arrow L in FIGS. 1 and 3. The lens bobbin block 60 is moved along the guide shafts 63, 64 by a feed motor (linear motor) provided within the frame 17a of the object lens driving device 17.

An object lens 55 is mounted on the upper surface of the lens bobbin block 60. Within the lens bobbin block 60 is mounted a reflecting mirror 54 for reflecting the collimated light beam incident from the optical block 18 back towards the object lens 55. Thus the collimated light beam, incident on the object lens driving device 17 from the optical block 18, is incident on the object lens 55 via reflecting mirror 54 and thereby rendered into a converged light beam, while being radiated upwards away from the chassis 2 in parallel with the spindle shaft 5.

The light beam radiated from the object lens 55 and reflected from the magneto-optical disc 102 on the disc table 4 is again incident on the object lens 55 and thereby rendered into a collimated light beam which is incident on the reflecting mirror 54. The light beam re-incident on the object lens 55 and thence transmitted to the reflecting mirror 54 is thereby reflected back towards the optical block 18. A photo detector for detecting the light returned to the optical block 18 is provided within the block 18. The light beam returned from the object lens driving device 17 to the optical block 18 is returned via galvanomirror 53 to a beam splitting prism 52 which causes the light beam from the galvanomirror 53 to be incident on a Wollaston prism 56 without returning the light to the collimator lens 51. The Wollaston prism is composed of two rectangular prisms of an optical material exhibiting optical anisotropy, such as calcite or quartz, arranged with their optical axes perpendicular to each other. The light beam transmitted through the Wollaston prism 56 is transmitted through a light converging convex lens 57 and a multiple lens 58 having a concave surface and an opposite cylindrical surface so as to be received by a photodiode 59 functioning as a light sensor.

Based on the detection output from the photodetector 59, focusing error signals are produced for indicating an amount of deviation along the optical axis of the point of convergence of the light beam converged by the object lens 55 from the signal recording surface of the magneto-optical disc 102. Similarly, tracking error signals indicating an amount of deviation in a direction perpendicular to the optical axis of the object lens 55 between the above-mentioned point of convergence and the recording track formed on the signal recording surface of the magneto-optical disc 102, and readout signals of information signals read out from the recording track of the magneto-optical disc 102, are produced.

Figure 4:
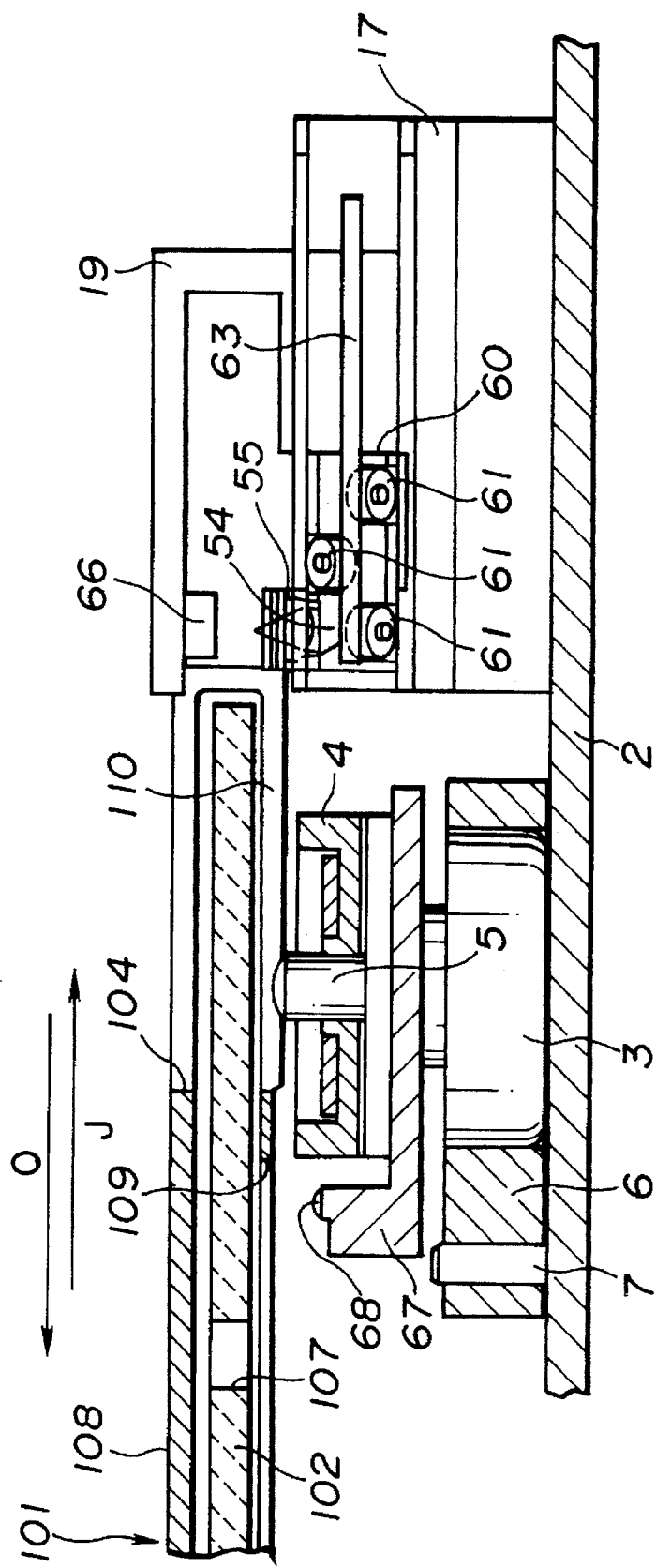
FIG. 4 is an enlarged side elevational view showing the state in which the disc cartridge has started to be introduced into the disc recording ad/or reproducing apparatus, with a portion thereof being broken away.

Referring to FIGS. 1 and 4, a magnetic head device 66, functioning as external magnetic field generating means, is mounted on the lens bobbin block 60 via a magnetic head supporting arm 19. The magnetic head device 66 is adapted for applying an external magnetic field for writing information signals on the magneto-optical disc 102. The magnetic head supporting arm 19 has its proximal end mounted on the lens bobbin block 60 and has its mid part bent so that its distal end is faced by the object lens 55. The magnetic head device 66 and the object lens 55 face each other with a distance in-between which is the sum of the thickness of the magneto-optical disc 102 and the working distance of the object lens 55 taking the amount of deviations from planarity of the magneto-optical disc 102 by the rotating and driving means taken into account. The working distance of the object lens 55 is the distance from the foremost end of the object lens 55 to the focal point of the object lens 55.

A cartridge holder 28 is arranged at a position above the chassis 2 in the casing 1. The cartridge holder 28 is formed from a substantially planar metal sheet having holding sections 29, 30 formed by bending both lateral sides. These holding sections 29, 30 are in the shape of a letter U in cross-section at both lateral sides by bending the lateral sides twice at right angles. The cartridge holder 28 is arranged parallel to the chassis 2 by having its lateral sides supported by the inner wall sections of the casing 1.

The cartridge holder 28 is so designed that the disc cartridge 101 may be introduced into a space defined between the holding sections 29, 30 from the front side. The disc cartridge 101 introduced between the holding sections 29, 30 has its lateral sides supported by these holding sections 29, 30. Thus the disc cartridge 101, inserted via inserting opening 25, is introduced into a space between the holding sections of the cartridge holder 28. The upper surface of the cartridge holder 28 is provided with cartridge thrusting springs 31 to 34 at the positions corresponding to four corners of the cartridge main body 108 of the disc cartridge 101 inserted in position between the holding sections 29, 30. These cartridge thrusting springs 31 to 34 are formed by segmenting the upper surface of the cartridge holder and bending the segmented portions down towards the chassis 2. These springs 31 to 34 thrust the disc cartridge 101 introduced between the holding sections 29, 30 towards the chassis 2.

The cartridge holder 28 is provided with a shutter opening lever 37 for opening the shutter member 103 of the disc cartridge 101. The shutter opening lever 37 has its proximal end supported by the rear side of the cartridge holder 28 for rotation about a pivot shaft 38 as a center of rotation. A shutter opening pin 41 is set at the distal end of the shutter opening lever 37 for depending towards the chassis 2. The shutter opening pin 41 is introduced into an arcuate slit 36 in the upper surface of the cartridge holder 28 so as to be intruded into the space defined between the holding sections 29, 30. The shutter opening pin 41 is moved within the guide slit 36 by rotation of the shutter opening lever 37. The shutter opening lever 37 is rotationally biased in a direction of rotating the shutter opening pin 41 towards the front side in a direction as indicated by arrow K in FIG. 1 by a torsion coil spring 39 having its coil part supported by pivot shaft 38. The torsion coil spring 39 has its one arm retained by the shutter opening lever 37 while having its opposite arm retained by a retention pawl 40 formed with the cartridge holder 28. When the disc cartridge 101 is not inserted into the cartridge holder 28, the shutter opening pin 41 is positioned at the forward initial position at the end of the arcuate guide slit 36. A plunger 20 is provided on the chassis 2 at a position corresponding to the mid part of the shutter opening lever 37 when rotated towards rear by the disc cartridge 101 inserted into the cartridge holder 28. The plunger 20 plays the role of locking the shutter opening lever 37 against being returned from its rear position towards its forward initial position.

Figure 10:
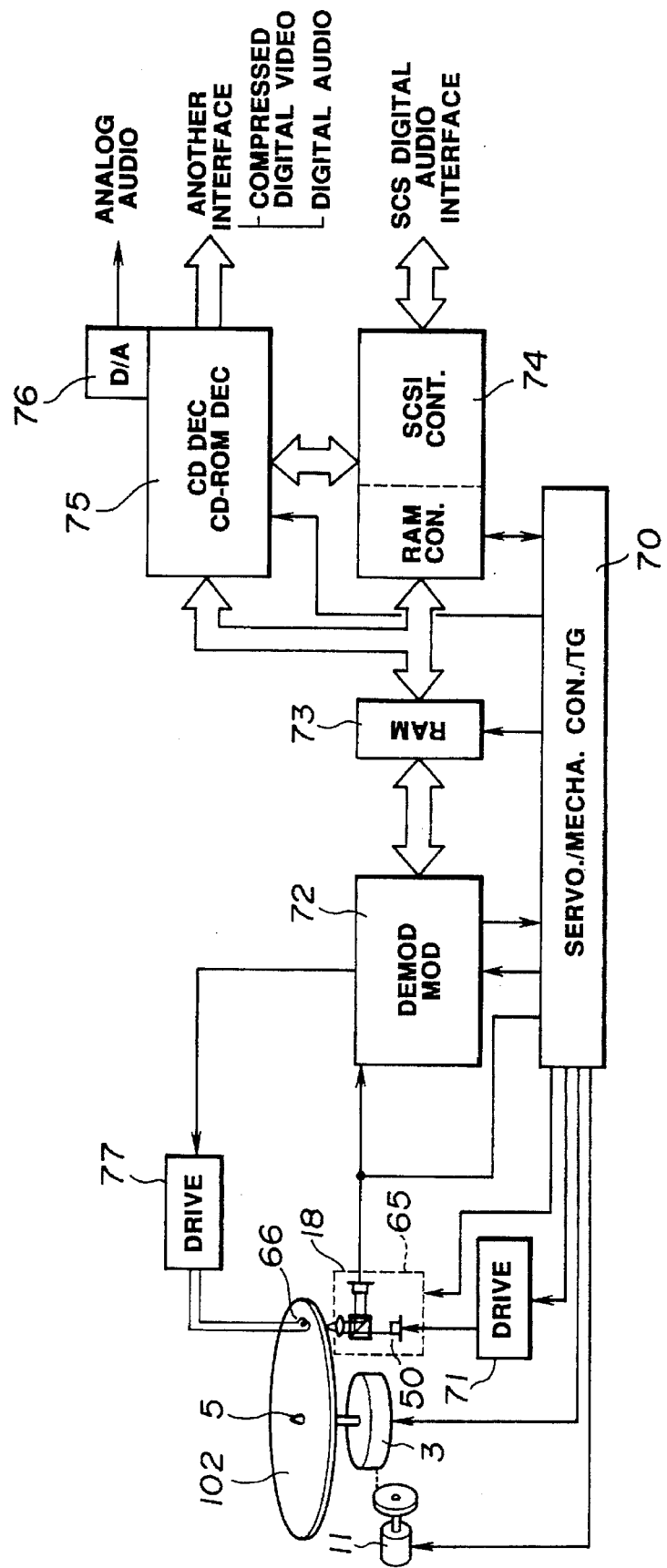
FIG. 10 is a block diagram showing the construction of a controller in the disc recording and/or reproducing apparatus.

The control means for the disc recording and/or reproducing apparatus is comprised of a control unit 70, as shown in FIG. 10. The control unit 70 includes electronic circuits for controlling the operation of the spindle motor 3, optical pickup device or the magnetic head device 66 on the basis of various input signals. More specifically, the control unit is formed by electronic components assembled on a printed circuit board in a space defined between the inner surface of the casing 1 and the cartridge holder 28 arranged in an upper part within the casing 1. The control unit is supplied with operating signals entered via an input device manually operated from outside of the disc recording and/or reproducing apparatus, output signals from the optical pickup device, detection signals indicating detected rotational velocity of the spindle motor 3 or the lifting motor 11, or detection signals indicating the end of insertion of the disc cartridge 101 into the cartridge holder 28. In the present disc recording and/or reproducing apparatus, the tracking servo operation based on the driving of the galvanomirror 53 of the optical pickup device, the focusing servo operation based on the driving control of the lifting motor 11 as later explained, or the spindle servo operation for controlling the rotational velocity of the spindle motor 3 so as to be constant, is performed on the basis of control signals from the control unit 70. A feed motor 65 feeds the lens bobbin block 60 radially across the magneto-optical disc 102 based on the detection signals from the optical pickup device, while feeding the object lens driving device 17 to a desired position on the magneto-optical disc 102 based on an accessing command supplied from the control circuit 70 based on commands from e.g. a host computer.

In the present disc recording and/or reproducing apparatus, the output level of the laser diode 50 is set to a playback level by correspondingly controlling a driving circuit 71 of the laser diode 50. The information signals read by the optical pickup device are transmitted for demodulation to a modem circuit 72 controlled by the control circuit 70. The signals demodulated by the modem circuit 72 are stored in a memory 73 controlled by the control circuit 70. The signals stored in memory 73 are outputted to a variety of external devices via an input/output, controller 74 controlled by the control unit 70. The signals stored in memory 73 are outputted to a variety of external devices via a decoder 75 controlled by the control unit 70, while being outputted to a variety of output devices as analog audio signals via a D/A converter 76.

On the other hand, in the present disc driving and/or reproducing apparatus, information signals entered via a variety of external devices are stored in memory 73 via input/output controller 74. Signals stored in memory 73 are transmitted to modem circuit 72 for demodulation. The signals modulated by the modem circuits 72 are supplied to a driving circuit 77 of a magnetic head 66 while being supplied to the driving circuit 71 of laser diode 50 for controlling the laser diode 50 for setting the output level of the laser diode 50 to a recording level. Information signals are written on the signal recording surface of the magneto-optical disc 102 by this optical pickup device and the magnetic head device 66.

For loading the disc cartridge 101 into the disc recording and/or reproducing apparatus according to the present invention, the disc cartridge 101 is inserted via the inserting opening 25 so as to be held between the holding sections 29, 30. At this time, the disc cartridge 101 is inserted with the shutter member 103 at the forward side, as shown by arrow J in FIG. 1.

The lower end of the shutter opening pin 41 is now abutted by the end of the connecting section of the shutter member 103 on the front side of the cartridge main body 108. When the disc cartridge 101 is further inserted into the inside of the holding sections 29, 30, the shutter opening pin 41 is thrust by the cartridge main body 108 for rotating the shutter opening lever 37 against the bias of the torsion coil spring 39 towards the rear side of the main body of the apparatus. At this time, the shutter opening pin 41 thrusts the connecting part of the shutter member 103, while being moved along guide slit 36, for opening the recording/reproducing apertures 104, 110 by the shutter member 103. When the recording/reproducing apertures 104, 110 are opened by the shutter member 103, the forward sides of the apertures of the shutter member 103 are located substantially in the center of the forward side of the cartridge main body 108. At this time, the forward side of the cartridge main body 108 is laid to outside via the apertures of the shutter member 103, as shown in FIG. 4.

The disc cartridge 101, inserted towards the rear of the main body of the apparatus, is moved towards the rear of the apparatus, while being thrust and supported towards the chassis 2 by the cartridge thrusting springs 31 to 34. During this time, the narrow portion of the connection part of the shutter member 103 is passed through a space between the object lens 55 and the magnetic head device 66, the forward side of the cartridge main body 108 is then passed through the space between the object lens 55 and the magnetic head device 66 and finally the disc 102 is introduced into the space between the object lens 55 and the magnetic head device 66. Since the space between the object lens 55 and the magnetic head device 66 is set so as to be wider than the thickness of the magneto-optical disc 102, the disc 102 is introduced into the space between the object lens 55 and the magnetic head device 66 without being abutted against the object lens 55 or the magnetic head device 66. The shutter opening lever 37 is locked by the plunger 20 at a position in which the shutter opening pin 41 is at the rear side. The lifting block 6 is urged by the tension coil spring 10 towards the chassis 2 so as to be positioned at an initial position.

Figure 5:
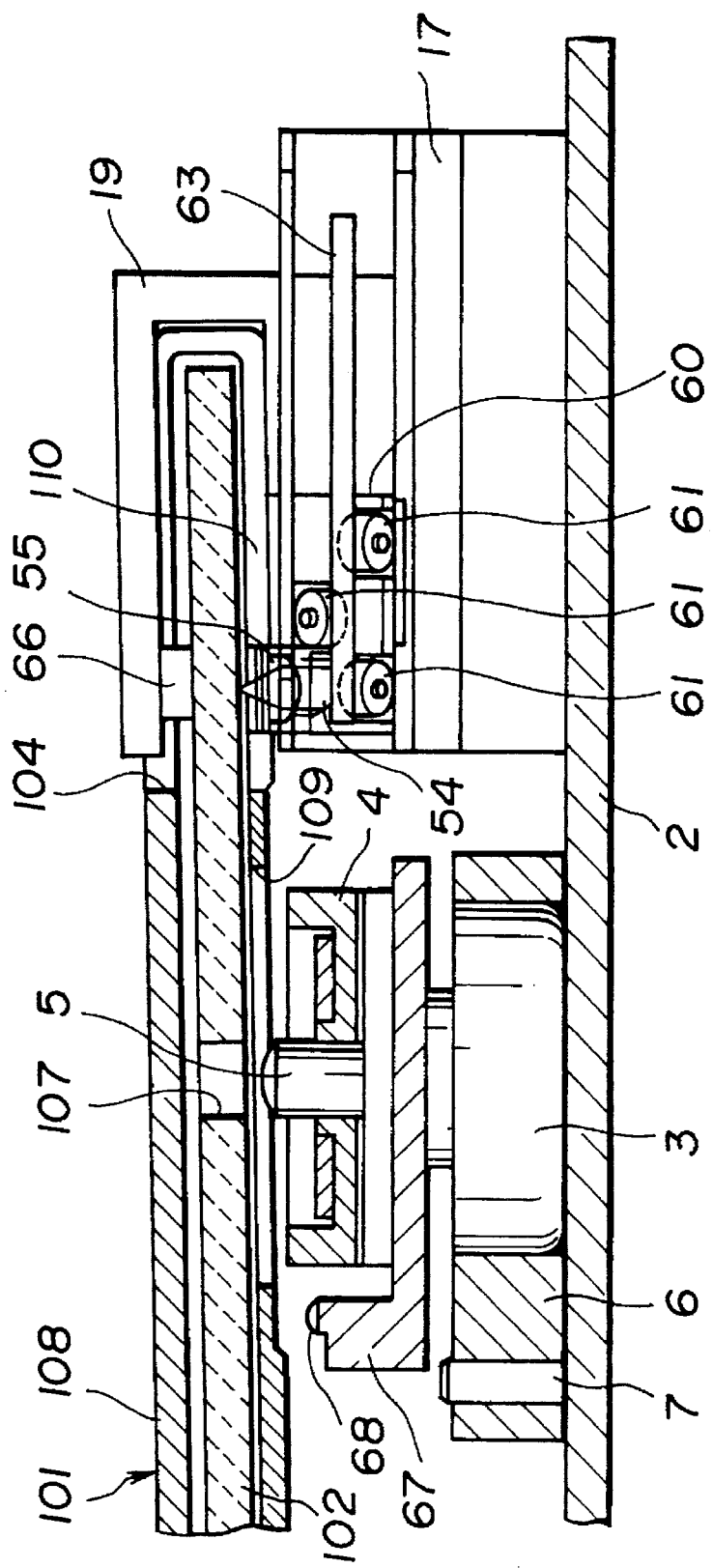
FIG. 5 is an enlarged side elevational view showing the state in which the operation of introducing the disc cartridge into the disc recording and/or reproducing apparatus has been completed, with a portion thereof being broken away.

When the disc cartridge 101 is introduced to a predetermined insertion complete position within the apparatus, the disc table 4 and the disc hub 106 face each other at a substantially coaxial position, as shown in FIG. 5. The insertion of the disc cartridge 101 to its insertion complete position is sensed by the detection device 42 so that a corresponding detection signal is transmitted to the control device 70. The detection device 42 is mounted at the rear side of the cartridge holder 28 in the vicinity of the pivot shaft 38 of the shutter opening lever 37. The detection device 42 includes e.g. a photocoupler for detecting entrance of an object into a slit 43 by optical or the like means. The detection device 42 is arranged at a position such that, when the disc cartridge 101 is inserted to a preset position in the apparatus, the shutter opening lever 37 rotated by the cartridge main body 108 of the disc cartridge 101 is partially intruded into the slit 43.

The controlling device 70, supplied with detection signals from the detection device 42, actuates the lifting motor 11, so that the cam gear 13 is rotated by means of the driving gear 12 and hence the lifting block 6 is moved upwards away from the chassis 2, as shown by arrow N in FIG. 6. That is, when the disc cartridge 101 is introduced to a predetermined position into the cartridge holder 28, the spindle motor 3 is moved by the lifting motor 11 from a non-rotating driving position in which the spindle motor is spaced apart from the disc 102 to a rotating driving position in which the spindle motor is closer to the disc 102 than at the non-rotating driving position. When the lifting block 6 is lifted to the rotating driving position, the disc hub 106 of the disc 102 is set on the disc table 4, while the cartridge main body 108 is set on the cartridge body positioning member 67, as shown in FIG. 6. The distal end of the spindle shaft 5 is fitted at this time in the centering hole 107. At this time, the abutment protuberances 68, 68, 68 of the positioning member 67 are abutted against positioning recesses 67, 67, 67 formed around the rim of the chucking opening 109 of the cartridge main body 108.

The cartridge main body 108, thus set on the cartridge positioning member 67, is moved in the space defined between the holding sections 29, 30 in a direction away from the chassis 2 against the bias of the cartridge thrusting springs 31 to 34. Besides, with the disc hub 106 thus set on the disc table 4, the magneto-optical disc 102 is spaced apart from the inner wall of the cartridge main body 108. Since the distance between the upper surface of the disc table 4 and the abutting protuberances 68 of the positioning member 67 is always constant, the magneto-optical disc 102 is maintained at a constant position with respect to the cartridge main body 108. The disc hub 106 is kept in pressure contact with the disc table 4 under the force of magnetic attraction exerted by a permanent magnet provided on the disc table 4.

When the spindle motor 3 is driven in this state, the disc 102 is rotationally driven simultaneously with the disc table 4 at a constant angular velocity by the spindle motor 3. On the other hand, the optical pickup including the optical block 18 and the lens bobbin block 17 and the magnetic head device 66 write information signals on the magneto-optical disc 102, rotationally driven by the spindle motor 31, by applying an external magnetic field and simultaneously radiating a light beam on the disc 102, while reading information signals previously recorded on the disc by radiating the light beam on the disc.

As stated above, the cam part 15 of the cam gear 13 includes a section for holding the disc 102 on the disc table 4 and a section for adjusting the height of the disc cartridge 101 after the end of the holding operation. The holding section of the cam part 15 has a cam profile such that the lifting block 6 is moved steeply to a predetermined height, while the height adjusting section of the cam part 15 has a cam profile such that the lifting block 6 may be moved within a minor distance. The cam gear 13 is provided with a rotary encoder, not shown, for detecting the rotational angular position of the cam gear 13. The rotary encoder generates detection signals for calculating the rotational velocity and the angular position of rotation of the cam gear 13.

With the magneto-optical disc 102 thus set on the disc table 4, the lifting motor 11 may be raised and lowered within a minor movement step of the order of e.g. 1 μm with respect to the lifting block 6. Thus, with the present disc driving and/or reproducing apparatus, by raising or lowering the lifting block 6 by the lifting motor 11 by minor steps of movement, with the disc 102 set on the disc table 102, the magneto-optical disc 102 may be adjusted at all times so as to be at a predetermined position relative to the object lens 55.

In this manner, by driving the lifting motor 11 based on the focusing error signals produced by the optical pickup device, the signal recording surface of the magneto-optical disc 102 may be set at all times on the focal point of the light beam formed by the object lens 55 by way of performing a focusing servo operation. Thus there is no necessity of providing an object lens driving device, that is an actuator, for moving the object lens 55 along the optical axis, in the optical pickup of the disc recording and/or reproducing apparatus.

Figure 7:
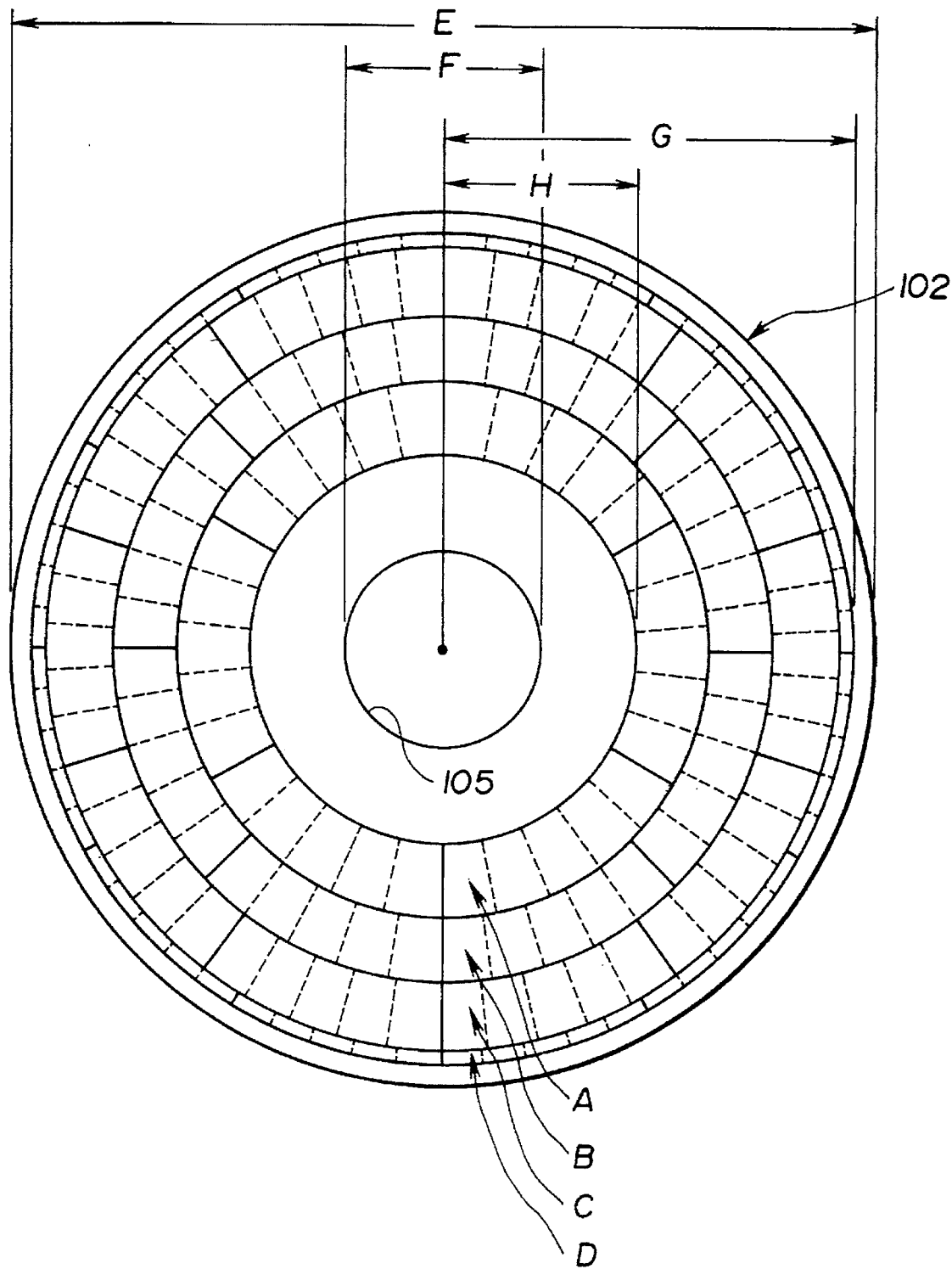
FIG. 7 is an enlarged plan view showing the construction of a disc of the disc cartridge.
Figure 8:
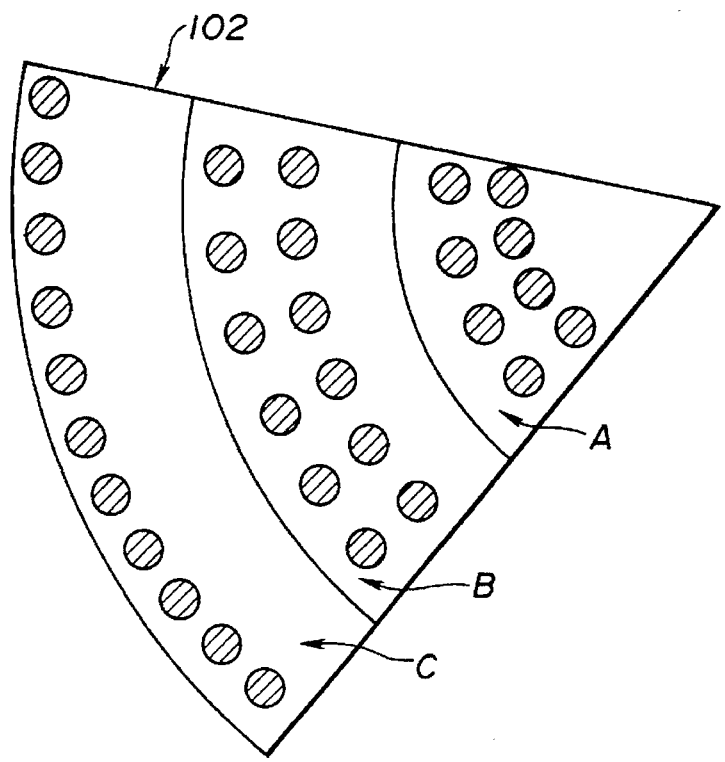
FIG. 8 is an enlarged schematic plan view showing a signal recording state on the disc.
Figure 9:
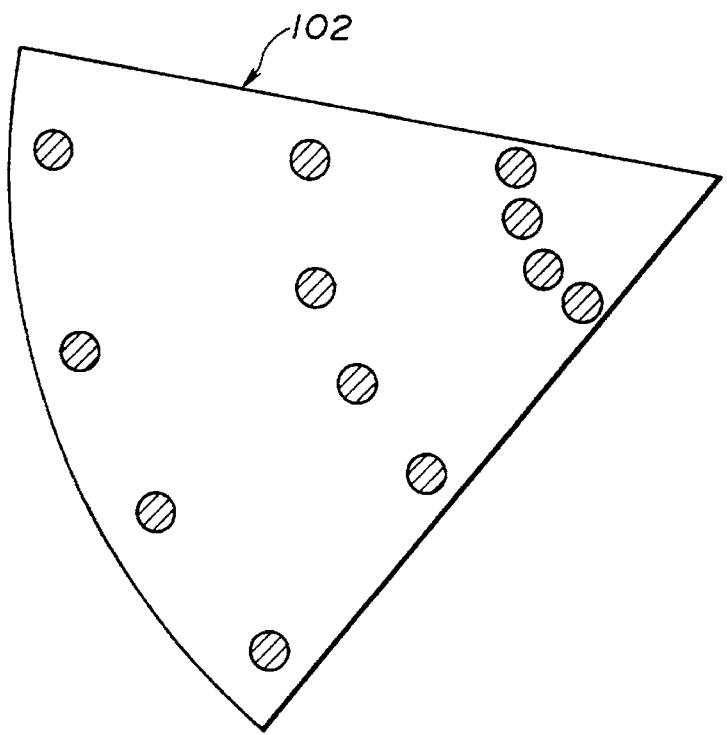
FIG. 9 is an enlarged schematic plan view showing another signal recording state on the disc.

Meanwhile, the signal recording region formed on the signal recording surface of the magneto-optical disc 102 has a distance from the center of the inner most edge of the disc shown by arrow H in FIG. 7 equal to 14.67 mm, and a distance from the center of the outer most edge of the disc shown by arrow G in FIG. 7 equal to 30.50 mm. The signal recording region is divided into plural zones from the inner towards the outer peripheries. That is, a first zone A, which is the inner most zone in the signal recording region, is extended in an area between the distance of 14.67 mm and the distance of 20.07 mm from the center. A second zone B, which is contiguous to and outside of the first zone A, is extended in an area between the distance of 20.07 mm and the distance of 24.70 mm from the center for surrounding the first zone A. A third zone C, which is contiguous to and outside of the second zone B, is extended in an area between the distance of 25.70 mm and the distance of 29.34 mm from the center for surrounding the second zone B. A fourth zone D, which is contiguous to and outside of the third zone C, is extended in an area between the distance of 29.34 mm and the distance of 30.50 mm from the center for surrounding the third zone C. In these zones A to D, digitized information signals are written in the form of pits, as shown in FIG. 8. These pits, corresponding to these information signals, are formed by minute projections, recesses or through-holes or as differences in the direction of magnetization in the signal recording layer of a magnetic material deposited on the disc substrate of the magneto-optical disc 102. These pits are so formed that the minimum pitch is 0.6 μm. Clock signals for servo are also written in the zones A to D.

In these zones A to D of the magneto-optical disc 102, the pits corresponding to the information signals are written at a substantially equal line recording density. Since the disc 102 is rotated at a constant angular velocity by the spindle motor 3, the frequencies of the digital signals corresponding to the pits formed in these zones A to D become higher towards the outer periphery of the disc, that is in the order of the zones A to D. The above-mentioned clock signals for servo are written so as to be read at a constant clock frequency $f_1$ across the inner and outer peripheries of the signal recording region.

In the present disc recording and/or reproducing apparatus, the clock signals for servo are used as channel clock signals having frequencies equal to $af_1$, a being a frequency conversion ratio associated with the each of zones A to D. The frequency conversion ratio a is set so as to higher towards the outer periphery of the disc, that is in the order of the zones A to D. That is, the frequency of the channel clock signals $af_1$ is selected so as to be higher towards the outer zones and lower towards the inner zones so as to be proportionate to the frequency of the digital signals written and read in these zones A to D. With the present disc recording and/or reproducing apparatus, since the frequency $af_1$ is proportionate to the frequency of the digital signals, digital signals may be written and read on the magneto-optical disc 102 based on these channel clock signals.

With the present magneto-optical disc 102, the numbers of recording tracks in the first to fourth zones A to D are 3857, 3307, 3314 and 828, totalling 11306. If sectors each 512 bytes (512 B) are formed in these recording tracks, 30, 40, 50 and 60 sectors may be formed in the zones A to D, respectively. The number of the sectors in the zones A to D are 115710, 135480, 165700 and 49680, totalling 466570. Thus the recording capacity of the magneto-optical disc 102 is 238 megabytes (238 MB).

If read-only sectors, or CD-ROM sectors, are formed in the recording tracks of the zones A to D, 6, 8, 10 and 12 sectors may be formed in the first zone A to the fourth zone D, respectively. In this case, the numbers of the sectors in the zones A to D are 23142, 27096, 33140 and 9936, totalling 933314. Thus the recording capacity of the magneto-optical disc 102 is 191 megabytes (198 MB).

In the present disc recording and/or reproducing apparatus, since the signal recording region of the magneto-optical disc 102 is divided into plural zones, in which the pits are formed at substantially the constant line recording density, and the disc 102 is adapted for being rotationally driven at a constant angular velocity, the recording density of the information signals on the magneto-optical disc 102 may be improved without complicating the construction of the apparatus. That is, if the pits are formed at a constant line density and the frequency of the digital signals read from the magneto-optical disc 102 is to be constant across the inner and outer peripheries of the disc, it becomes necessary to rotate the magneto-optical disc 102 so that the disc is rotated at a constant linear velocity at a portion of the disc faced by the object lens, thus complicating the structure. On the other hand, if the magneto-optical disc 102 is rotated at a constant angular velocity and the frequency of the digital signals read from the magneto-optical disc 102 is to be constant across the inner and outer peripheries of the disc 102, it is necessary to set the line density so as to be lower towards the outer disc periphery, so that the recording density of the information signals on the magneto-optical disc 102 cannot be increased.

Meanwhile, the diameter of the center opening 105 of the disc substrate of the magneto-optical disc 102, as shown by arrow F in FIG. 7, is 15 mm.

The construction of the disc recording and/or reproducing apparatus according to the present invention is not limited to that shown in the above embodiment. For example, a mechanism of lifting the cartridge holder 28 holding the disc cartridge 101 may be used as loading means in place of the mechanism of lifting the spindle motor 3.

Also, in the optical pickup in the present disc recording and/or reproducing apparatus, the so-called tracking servo, in which the light beam radiated from the object lens 55 is caused to follow periodic movements of the recording tracks along the radius of the disc due to offsetting of the magneto-optical disc 102 caused by rotation of the magneto-optical disc 102, is achieved by deviating the light beam incident on the object lens 55 by the galvano-mirror 53. However, the tracking servo may also be realized by moving the lens bobbin block 60 along the pickup guide shafts 63, 64 or by supporting only the object lens 55 by the object lens driving device for moving the light flux along the radius of the magneto-optical disc 102 with respect to the lens bobbin block 60.

In the present disc recording and/or reproducing apparatus, as described above, a signal recording and/or reproducing section for recording and/or reproducing information signals on or from a magneto-optical disc of 64 mm in diameter, accommodated in a cartridge main body, and having its signal recording section divided into plural signal recording regions having a substantially equal line recording density, loading means for loading and/unloading the disc cartridge, which is a magneto-optical disc accommodated in a cartridge main body, with respect to the signal recording and/or reproducing section, and controlling means for controlling the recording/reproducing operation of the signal recording/reproducing section, are housed in a casing which is 70 mm or less in width, 100 mm or less in length and 24.5 mm or less in height and which is provided with a disc cartridge inserting opening.

The result is that, with the present disc recording and/or reproducing apparatus, the apparatus may be reduced in size without decreasing the recording capacity.

Also, with the present disc recording and/or reproducing apparatus, disc rotating and driving means may be moved by movement means from the non-rotating driving position spaced apart from the magneto-optical disc to the rotating driving position in which the rotating and driving means is located closer to the disc than at the non-rotating driving position upon completion of loading of the disc cartridge by the loading means.

Thus, with the present disc recording and/or reproducing apparatus, the above-mentioned loading means and hence the disc recording and/or reproducing apparatus may be simplified in construction.

What is claimed is:

1. A magneto-optical disc recording and reproducing apparatus comprising:

signal recording and reproducing means including optical means for radiating a light beam onto a magneto-optical disc housed within a disc cartridge and for receiving light returning from the disc, the disc having a signal recording region divided from an inner periphery to an outer periphery into a plurality of concentric signal recording zones, each signal recording zone having a plurality of information elements formed on the signal recording region with a substantially equal line recording density so that the number of information elements storable per track increases from zone to zone from the inner periphery to the outer periphery, whereby the information elements are reproduced at increasing frequencies from the innermost zone to the outermost zone, and a plurality of servo clock signals formed in the zones, whereby the servo clock signals recorded at different radial distances from the center of the disc are reproduced at a substantially constant frequency;

magnetic field generating means for applying a magnetic field when information signals are being recorded on the disc;

rotating driving means for rotatably driving the disc at a substantially constant angular velocity;

loading means for loading the disc cartridge onto the signal recording and reproducing means and for unloading the disc cartridge from the signal recording and reproducing means, and controlling means for controlling the signal recording and reproducing means and for converting the substantially constant frequency reproduced from the servo clock signals for use as plural channel clock frequencies for reproducing and recording signals in the signal recording zones, each signal recording zone having one corresponding channel clock frequency, such that the channel clock frequencies of signal recording zones located at larger radial distances from the center of the disc are higher than channel clock frequencies of signal recording zones located at smaller radial distances from the center of the disc.

2. The magneto-optical disc recording and reproducing apparatus as claimed in claim 1 wherein the disc cartridge houses the disc during recording and reproducing, further comprising movement means for moving the rotating driving means after the disc cartridge has been loaded onto the signal recording and reproducing means by the loading means, the movement means moving the rotating driving means from a non-rotating position spaced apart from the disc and the disc cartridge to a rotating position closer to the disc and the disc cartridge.

3. The magneto-optical disc recording and reproducing apparatus as claimed in claim 2 further comprising detection means for detecting that the disc cartridge has reached a predetermined position in the apparatus, the controlling means further for controlling the movement means based on a detection output from the detection means.

4. The magneto-optical disc recording and reproducing apparatus as claimed in claim 2 further comprising positioning means for positioning the disc cartridge onto the rotating driving means when the movement means moves the rotating driving means to the rotating position after the disc cartridge has been inserted via a cartridge opening.

5. The magneto-optical disc recording and reproducing apparatus as claimed in claim 1, the apparatus further comprising an outer casing including at least a lower chassis in parallel with the disc when the disc is loaded onto the signal recording and reproducing means and a cartridge opening on a side of the outer casing, and wherein the optical means include:

a fixed optical system section at least having a light source for emitting the light beam, light detection means, and an optical element for focusing error detection, the fixed optical system located adjacent to the disc within the outer casing;

a movable optical system located adjacent to a lower optical surface of the disc when the disc is loaded onto the signal recording and reproducing means, the movable optical system mounted to move along a radius of the disc;

feed means for moving the movable optical system radially across the disc the feed means including
a feed motor and
a pair of parallel guides in parallel with the disc and the lower chassis;

optical support means for movably supporting the movable optical system along the parallel guides, the support means having a lateral side along each of the parallel guides; and rolling means attached to the optical support means for rolling on and holding the parallel guides, the rolling means including at least two rows of at least three guide rolls, each row of guide rolls positioned along each lateral side of the optical support means, such that at least one guide roll of each row of guide rolls extends upward at an angle to rest against an upper surface of one of the parallel guides and the remaining guide rolls in the same row of guide rolls extend downward at an angle to rest against a lower surface of the same parallel guide.

6. The magneto-optical disc recording and reproducing apparatus as claimed in claim 5 wherein the loading means include a cartridge holder for horizontally guiding and holding the disc cartridge as it is inserted via the cartridge opening, and biasing means for biasing the disc cartridge toward the lower chassis when the disc cartridge is inserted into the cartridge holder.

7. A magneto-optical disc recording and reproducing apparatus for a magneto-optical disc, said apparatus comprising:

said magneto-optical disc having a plurality of concentric tracks or a spiral track for recording data and being housed within a disc cartridge, the diameter of said magneto-optical disc being substantially 64 mm and the storage capacity of said magneto-optical disc being at least 191 MB, said disc having a signal recording region divided from an inner periphery to an outer periphery into a plurality of concentric signal recording zones, each signal recording zone having a plurality of sectors formed on the signal recording region with a substantially equal line recording density so that the number of sectors storable per track increases from zone to zone from the inner periphery to the outer periphery, whereby the sectors are reproduced at increasing frequencies from the innermost zone to the outermost zone, and a plurality of servo clock signals are formed in the zone, whereby the servo clock signals recorded at different radial distances from the center of said disc are reproduced at a substantially constant frequency;

signal recording and reproducing means including optical means for radiating a light beam onto said magneto-optical disc and for receiving a light beam returning from said disc;

magnetic field generating means arranged to oppose to said optical means through said disc and for applying a vertical magnetic field according to recording data from said signal recording and reproducing means when information signals are being recorded on said disc, said magnetic field generating means being moved with said optical means in the radial direction of said disc;

rotating driving means for rotatably driving said disc at a constant angular velocity;

loading means for loading said disc cartridge onto said signal recording and reproducing means and unloading said disc cartridge from said recording and reproducing means; and controlling means for converting a substantially constant frequency reproduced from the servo clock signals for use as plural channel clock frequencies for reproducing and recording signals in the signal recording zones, each signal recording zone having one corresponding channel clock frequency such that the channel clock frequencies of the signal recording zones located at larger radial distances from the center of said disc are higher than the channel clock frequencies of signal recording zones located at smaller radial distances from the center of said disc, and for controlling said recording and reproducing means according to the channel clock frequencies.

* * * * *